United States Patent
Xu et al.

(10) Patent No.: US 11,842,569 B2
(45) Date of Patent: Dec. 12, 2023

(54) EYE STATE DETECTION-BASED IMAGE PROCESSING METHOD AND APPARATUS, AND STORAGE MEDIUM

(71) Applicant: Beijing Bytedance Network Technology Co., Ltd., Beijing (CN)

(72) Inventors: Wang Xu, Beijing (CN); Guanghui Chen, Beijing (CN); Yitian Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/087,660

(22) Filed: Dec. 22, 2022

(65) Prior Publication Data

US 2023/0140313 A1 May 4, 2023

Related U.S. Application Data

(63) Continuation of application No. PCT/CN2021/114881, filed on Aug. 27, 2021.

(30) Foreign Application Priority Data

Aug. 31, 2020 (CN) .......................... 202010899317.9

(51) Int. Cl.
G06V 40/18 (2022.01)
G06T 7/73 (2017.01)
G06V 40/16 (2022.01)

(52) U.S. Cl.
CPC ............... *G06V 40/18* (2022.01); *G06T 7/73* (2017.01); *G06V 40/161* (2022.01); *G06T 2207/20081* (2013.01); *G06T 2207/30201* (2013.01)

(58) Field of Classification Search
CPC ... G06T 5/001; G06T 5/50; G06T 7/11; G06T 7/174; G06T 7/70; G06T 7/73; G06T 2207/30201; G06V 40/161; G06V 40/167; G06V 40/171; G06V 40/174; G06V 40/175; G06V 40/176; G06V 40/18; G06V 40/193; H04N 23/611; H04N 23/64
See application file for complete search history.

(56) References Cited

U.S. PATENT DOCUMENTS

| | | | |
|---|---|---|---|
| 5,878,156 A | 3/1999 | Okumura | |
| 7,659,923 B1* | 2/2010 | Johnson ............... | H04N 23/611 382/117 |
| 8,411,171 B2* | 4/2013 | Kim et al. ........... | H04N 23/635 348/222.1 |
| 9,336,583 B2* | 5/2016 | Huang et al. ............. | G06T 5/50 |
| 2008/0252745 A1* | 10/2008 | Nakamura ........... | H04N 23/611 348/222.1 |
| 2010/0066840 A1* | 3/2010 | Asukai et al. ....... | H04N 23/951 348/222.1 |
| 2010/0302394 A1* | 12/2010 | Srinivasa Rao et al. ..................... | H04N 23/667 348/222.1 |
| 2012/0081560 A1* | 4/2012 | Park et al. ......... | H04N 23/6845 348/241 |
| 2015/0256741 A1* | 9/2015 | Towal et al. ........... | H04N 23/64 348/222.1 |
| 2017/0032172 A1* | 2/2017 | Lee et al. ................ | G06T 5/005 |
| 2019/0073811 A1* | 3/2019 | Shah et al. ........... | G06V 40/193 |

FOREIGN PATENT DOCUMENTS

| | | |
|---|---|---|
| CN | 107622483 A | 1/2018 |
| CN | 107734253 A | 2/2018 |
| CN | 108520036 A | 9/2018 |
| CN | 108574803 A | 9/2018 |
| CN | 109376624 A | 2/2019 |
| CN | 110163806 A | 8/2019 |
| CN | 112036311 A | 12/2020 |

OTHER PUBLICATIONS

International Search Report issued in International Patent Application No. PCT/CN2021/114881 dated Nov. 18, 2021.

* cited by examiner

*Primary Examiner* — Andrew W Johns
(74) *Attorney, Agent, or Firm* — ARENTFOX SCHIFF LLP (57) ABSTRACT

An eye state detection-based image processing method and apparatus, a device, and a storage medium are provided. The method comprises: detecting eye states of a target face in an image set to be processed to obtain target area images in which the eye states meet a preset condition, then determining therefrom a target effect image corresponding to the target face, and finally synthesizing the target effect image onto a reference image in the image set to be processed to obtain a target image corresponding to the image set to be processed.

18 Claims, 3 Drawing Sheets

EYE STATE DETECTION-BASED IMAGE PROCESSING METHOD AND APPARATUS, AND STORAGE MEDIUM

The present disclosure is a continuation application of International Application No. PCT/CN2021/114881, filed on Aug. 27, 2021, which claims the priority to Chinese patent application No. 202010899317.9, titled "METHOD AND APPARATUS FOR PROCESSING IMAGE BASED ON EYE STATE DETECTION, AND STORAGE MEDIUM", filed on Aug. 31, 2020 with the China National Intellectual Property Administration, both of which are incorporated herein by reference in their entireties.

FIELD

The present disclosure relates to the field of image data processing, and in particular to a method, an apparatus and a device for processing an image based on an eye state detection, and a storage medium.

BACKGROUND

When capturing a photo, a person in the captured photo may have an unideal eye state (for example, "someone closes his eyes"), and therefore the user has to re-capture a photo or even re-capture photos repeatedly. Especially in a case of capturing a group photo, it's more likely to encounter an unideal eye state such as "someone closes his eyes", or "someone doesn't look at a camera", which leads to repeated re-capturing, thus affecting user experience.

At present, the user usually has to manually select, from multiple photos captured repeatedly, a photo in which eye states of most people are ideal as a final group photo. Nonetheless, the selected group photo, still having the problem of unideal eye state to some extent, can hardly show best eye state of each person in the capturing process. Therefore, the user has reduced satisfaction degree with the final group photo.

SUMMARY

In order to solve the above technical problem or at least partially solve the above technical problem, an image processing method based on eye-state detection, an image processing apparatus based on eye-state detection, a device, and a storage medium are provided according to the present disclosure, which can improve effect in terms of eye state of each person in a group photo, ensure a quality of the group photo, and improve a satisfaction degree of a user with the final group photo.

In a first aspect, an image processing method based on eye-state detection is provided according to the present disclosure. The method includes:
performing eye state detection for a target face in a to-be-processed image set to obtain target area images each with an eye state meeting a preset condition, where the to-be-processed image set includes multiple continuous images, and each of the multiple images includes at least one face;
determining a target effect image corresponding to the target face based on the target area images each with the eye state meeting the preset condition; and
synthesizing the target effect image corresponding to the target face onto a reference image in the to-be-processed image set to obtain a target image corresponding to the to-be-processed image set.

In an optional embodiment, the preset condition includes that an eye-openness is greater than a preset openness threshold.

In an optional embodiment, the performing eye state detection for a target face in a to-be-processed image set to obtain target area images each with an eye state meeting a preset condition includes:
determining face images of the target face from the to-be-processed image set; and
performing the eye state detection on the face images of the target face, to obtain the face images each with the eye state meeting the preset condition among the face images of the target face as the target area image.

In an optional embodiment, the performing the eye state detection on the face images of the target face includes:
extracting eye images of the target face from the face images of the target face; and
performing the eye state detection on the eye images of the target face.

In an optional embodiment, the performing eye state detection for a target face in a to-be-processed image set to obtain target area images each with an eye state meeting a preset condition includes:
determining eye images of the target face from the to-be-processed image set; and
performing the eye state detection on the eye images of the target face, to obtain eye images with the eye state meeting the preset condition among the eye images of the target face as the target area images.

In an optional embodiment, the performing the eye state detection on the eye images of the target face includes:
determining position information of an eye key point in the eye image of the target face; and
determining the eye state corresponding to the eye image based on the position information of the eye key point.

In an optional embodiment, the determining position information of an eye key point in the eye image of the target face includes:
inputting the eye image of the target face into a first model to obtain the position information of the eye key point in the eye image, where the first model is obtained by training with an eye image sample marked with the position information of the eye key point.

In an optional embodiment, the performing the eye state detection on the eye images of the target face includes:
determining an eye state value in the eye image of the target face, where the eye state value includes an eye-opening state value and an eye-closing state value; and
determining the eye state corresponding to the eye image based on the eye state value.

In an optional embodiment, the determining an eye state value in the eye image of the target face includes:
inputting the eye image of the target face into a second model to obtain the eye state value in the eye image, where the second model is obtained by training with an eye image sample marked with the eye state value.

In an optional embodiment, the eye state corresponding to the eye image is determined based on a ratio of an eye-opening width in a vertical direction to a distance between two canthi in a horizontal direction; and the ratio of the eye-opening width in the vertical direction to the distance between the two canthi in the horizontal direction is determined based on the position information of the eye key point.

In an optional embodiment, before the performing eye state detection for a target face in a to-be-processed image set, the method further includes:

acquiring, in response to a trigger operation on a shutter key, a current image frame together with a plurality of continuous preview images ending at the current image frame, as the to-be-processed image set.

In an optional embodiment, before the synthesizing the target effect image corresponding to the target face onto a reference image in the to-be-processed image set to obtain a target image corresponding to the to-be-processed image set, the method further includes:

determining, in the to-be-processed image set, a current image frame corresponding to a moment of pressing a shutter key as the reference image.

In an optional embodiment, the determining a target effect image corresponding to the target face based on the target area images each with the eye state meeting the preset condition includes:

determining a target area image with a largest eye-openness among the target area images each with the eye state of the target face meeting the preset condition as the target effect image corresponding to the target face.

In an optional embodiment, the determining face images of the target face from the to-be-processed image set includes:

performing face detection on the reference image in the to-be-processed image set, to determine position information of all faces in the reference image; and determining, based on the position information of all the faces, the face images corresponding to the position information of the target face on images of the to-be-processed image set, as the face images of the target face.

In an optional embodiment, the determining face images of the target face from the to-be-processed image set includes:

performing face detection on each image in the to-be-processed image set to obtain a face image; and determining face images with a similarity greater than a preset similarity threshold as the face images of the target face.

In a second aspect, an image processing apparatus based on eye-state detection is provided according to the present disclosure. The apparatus includes a first detection module, a first determination module, and a synthesis module.

The first detection module is configured to perform eye state detection for a target face in a to-be-processed image set to obtain target area images each with an eye state meeting a preset condition, where the to-be-processed image set includes multiple continuous images, and each of the multiple images includes at least one face.

The first determination module is configured to determine a target effect image corresponding to the target face based on the target area images each with the eye state meeting the preset condition.

The synthesis module is configured to synthesize the target effect image corresponding to the target face onto a reference image in the to-be-processed image set to obtain a target image corresponding to the to-be-processed image set.

In a third aspect, a computer readable storage medium storing instructions is provided according to the present disclosure. The instructions, when being executed on a terminal device, cause the terminal device to implement the above method.

In a fourth aspect, a device is provided according to the present disclosure. The device includes a memory, a processor, and a computer program stored in the memory and executable on the processor, where the processor executes the computer program to implement the above method.

Compared with the conventional art, the technical solutions provided according to the present disclosure have the following advantages.

An image processing method based on eye-state detection is provided according to the present disclosure. First, eye state detection for a target face is performed in a to-be-processed image set to obtain target area images each with an eye state meeting a preset condition. Then, a target effect image corresponding to the target face is determined from the target area images with the eye state meeting the preset condition. Finally, the target effect image is synthesized onto a reference image in the to-be-processed image set to obtain a target image corresponding to the to-be-processed image set. According to the present disclosure, eye state detection is performed to determine a target effect image for each face, and the target effect image of each face is synthesized onto a reference image, which can improve effect in terms of eye state of each person in a final target image, improve a quality of the target image, and improve a satisfaction degree of a user with the target image to a certain extent.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings can be obtained according to the provided drawings without any creative effort.

DETAILED DESCRIPTION OF EMBODIMENTS

In order to understand the above objects, features and advantages of the present disclosure more clearly, the solutions of the present disclosure are further described hereinafter. It should be noted that the embodiments of the present disclosure and the features in the embodiments can be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

Eye state of a person in an image (such as a group photo) is a factor for evaluating the quality of the image. Taking the case of group photo as an example, in an actual photographing scene, for obtaining a group photo showing a best eye state for each person in the capturing process, multiple group photos are re-photographed, and an ideal group photo is manually selected from the multiple group photos.

The re-photographing, reducing a user experience in photographing, still cannot guarantee an ideal eye state of each person in the re-captured group photo, which affects a satisfaction degree of a user with the group photo.

For this reason, an image processing method based on eye-state detection is provided according to the present disclosure. First, eye state detection for a target face is performed in a to-be-processed image set to obtain target area images with an eye state meeting a preset condition. Then, a target effect image corresponding to the target face is determined from the target area images with the eye state meeting the preset condition. Finally, the target effect image is synthesized onto a reference image in the to-be-processed image set to obtain a target image corresponding to the to-be-processed image set.

Based on the above photographing scene, in the image processing method based on the eye state detection according to the embodiment of the present disclosure, after a group photo is captured, eye states of persons in the group photo are detected, a target effect image is determined for each face in the group photo, and the target effect image of each face is synthesized onto the original group photo, so that an eye state effect of each person in a final group photo is better, a quality of the group photo is improved, and a satisfaction degree of a user with the group photo is improved.

Figure 1:
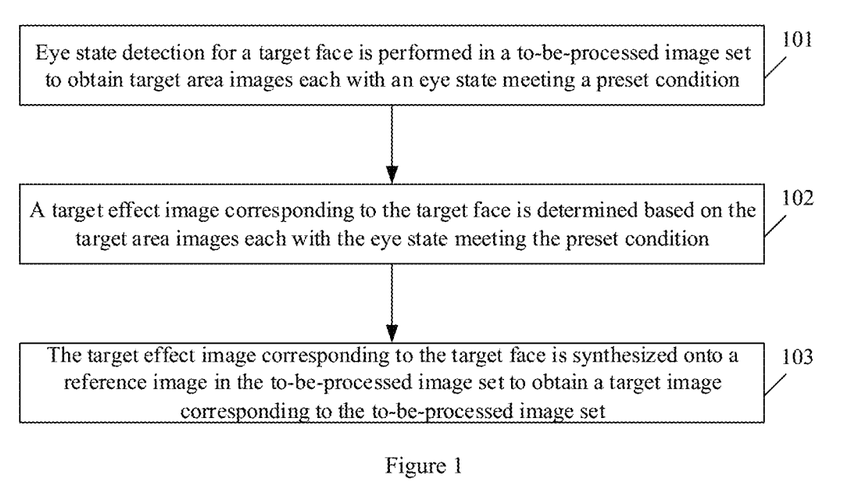
FIG. 1 is a flowchart of an image processing method based on eye-state detection according to an embodiment of the present disclosure.

Based on this, an image processing method based on eye-state detection is provided according to an embodiment of the present disclosure. Reference is made to FIG. 1 which is a flowchart of an image processing method based on eye-state detection according to an embodiment of the present disclosure. The method includes the following steps S101 to S103.

In S101, eye state detection is performed for a target face in a to-be-processed image set to obtain target area images each with an eye state meeting a preset condition.

The preset condition includes that an eye-openness is greater than a preset openness threshold. The to-be-processed image set includes multiple continuous images, and each of the multiple images includes at least one face.

In an optional embodiment, in a scene of capturing a photo, in response to detecting a trigger operation on a shutter key (e.g., pressing the shutter key), a current image frame together with multiple continuous preview images ending at the current image frame are acquired as the multiple continuous images forming the to-be-processed image set in the embodiment of the present disclosure.

In practical application, in a camera preview mode, preview images in a camera preview interface are stored in a form of preview stream. In the embodiment of the present disclosure, in the camera preview mode, in response to detecting that a shutter key is pressed, not only the current image frame, that is, the captured photo, but also the latest N preview images stored in the preview stream, are acquired. Then, the latest N preview images and the current image frame together form the to-be-processed image set. Generally, the to-be-processed image set includes 8 images or 16 images. The number of images in the to-be-processed image set is not limited in the embodiment of the present disclosure. In other embodiments, more images may be included in the to-be-processed image set.

In another optional embodiment, in a scene of capturing a photo in a continuous capturing mode, in response to detecting the trigger operation of pressing the shutter key, multiple images continuously captured are acquired as the multiple continuous images forming the to-be-processed image set in the embodiment of the present disclosure.

In an embodiment of the present disclosure, after acquiring the to-be-processed image set, eye state detection is performed for the target face in the to-be-processed image set. The target face may be one of multiple faces in the images in the to-be-processed image set.

In an optional embodiment, eye state detection for a target face is performed in the to-be-processed image set by: determining face images of the target face from the to-be-processed image set; and performing the eye state detection on the face images of the target face, to obtain a face image with an eye state meeting the preset condition among the face images of the target face, as the target area image.

According to an embodiment of the present disclosure, at least the following two methods for determining the face images of the target face from the to-be-processed image set are provided, which are respectively introduced below.

In an optional embodiment, a face detection is performed on a reference image in the to-be-processed image set, to determine position information of all faces in the reference image. Based on the position information of all the faces, a face image corresponding to position information of the target face in an image in the to-be-processed image set is determined as the face image of the target face.

In practical application, a current image frame corresponding to a moment of pressing a shutter key in a capturing process is usually an image in which eye states of most people are better in this capturing. Therefore, according to an embodiment of the present disclosure, in the to-be-processed image set, the current image frame corresponding to the moment of pressing the shutter key may be determined as the reference image. In this way, on the basis of the reference image, position information of all faces is determined, and a face image corresponding to the target face is determined based on the position information of all the faces, which can improve the accuracy of the face image corresponding to the target face.

In an embodiment of the present disclosure, after the reference image in the to-be-processed image set is determined, a face detection may be performed on the reference image based on a machine learning model to determine position information of all faces in the reference image. Position information of all faces in multiple continuously captured images remains basically the same in a capturing process. Therefore, a face image corresponding to the target face in other images in the to-be-processed image set may be determined based on the position information of the faces determined on the reference image. It can be understood that a face image on a same position of each image in the to-be-processed image set belongs to a same person.

The image of the target face may be a minimal rectangular area including the target face. The minimal rectangular area including the target face may be determined based on the position information of the target face.

In another optional embodiment, the face images of the target face may also be determined from the to-be-processed image set by combining face detection with similarity calculation. Specifically, a face detection is performed on each image in the to-be-processed image set to obtain face images. Then, a face image with a similarity greater than a preset similarity threshold is determined as the face image of the target face.

In practical application, the similarity of the face images of the target face is high. Therefore, according to an embodiment of the present disclosure, after face images in each image in the to-be-processed image set are determined, face images of the target face may be determined based on the similarity of the face images. Specifically, a face image with a similarity greater than a preset similarity threshold is determined as the face image of the target face.

In an embodiment of the present disclosure, in a process of performing eye state detection for the face image, an eye image is first extracted from the face image. Then, the eye state detection is performed on the eye image to complete the eye state detection of the face image. According to an embodiment of the present disclosure, a method for performing eye state detection for an eye image is provided, which will be introduced later.

In an optional embodiment, in a process of performing eye state detection for the target face in the to-be-processed image set, eye images of the target face may be determined from the to-be-processed image set, and the eye state detection is performed on the eye images of the target face, to obtain an eye image with an eye state meeting the preset condition from the eye images of the target face as the target area image.

In practical application, an eye detection may be performed on the reference image in the to-be-processed image set by using a machine learning model, to determine position information of eyes on the reference image. Then, eye images corresponding to eyes on each image in the to-be-processed image set may be further determined based on the position information of the eyes determined on the reference image. It should be noted that eye images on a same position of respective images in the to-be-processed image set belong to a same person.

The eye image may be a minimal rectangular area including the eye. Specifically, the eye image may be a minimal rectangular area including a left eye, a minimal rectangular area including a right eye, and a minimal rectangular area including both a left eye and a right eye.

In another optional embodiment, the eye image of the target face may also be determined from the to-be-processed image set by combining eye detection with similarity calculation. Specifically, an eye detection is performed on each image in the to-be-processed image set to obtain eye images. Then, an eye image with a similarity greater than a preset similarity threshold is determined as the eye image of the target face.

In an embodiment of the present disclosure, after the eye state detection for the target face is performed in the to-be-processed image set, a target area image with an eye state of each face meeting a preset condition is obtained. The target area image may be a face image or an eye image.

In an embodiment of the present disclosure, an eye state corresponding to an eye image may be determined based on position information of an eye key point or an eye state value in the eye image, or a combination of the position information of the eye key point and the eye state value. According to an embodiment of the present disclosure, a specific implementation for determining an eye state corresponding to an eye image is provided, which will be introduced later.

In S102, a target effect image corresponding to the target face is determined based on the target area image with the eye state meeting the preset condition.

In practical application, an eye state of each person in an ideal photo is usually in eye-opening state, and a degree of eye opening should meet a certain standard. Therefore, according to an embodiment of the present disclosure, a target area image with an eye state of the target face meeting the preset condition is first determined, and a target effect image corresponding to each face is further determined based on the determined target area image. The eye state meeting the preset condition may mean that an eye-openness is greater than a preset openness threshold.

In an optional embodiment, a target area image with a largest eye-openness from the target area images of the target face may be determined as the target effect image corresponding to the target face, to improve an eye-opening degree of each face in a target image, and further improve a satisfaction degree of a user with the target image.

In another optional embodiment, any one of the target area images of the target face may be determined as the target effect image corresponding to the target face, to meet a basic requirement of a user for an eye state effect in the target image.

In an optional embodiment, if it is determined that an eye state of a face (e.g., a first face) in the reference image meets the preset condition, the synthesizing may be omitted for the first face to improve an efficiency of image processing.

In S103, the target effect image corresponding to the target face is synthesized onto a reference image in the to-be-processed image set to obtain a target image corresponding to the to-be-processed image set.

In an embodiment of the present disclosure, after the target effect image corresponding to each face is determined, the target effect image is synthesized onto the reference image in the to-be-processed image set, to obtain a target image corresponding to the to-be-processed image set.

Since the target image is obtained based on the target effect image, eye state effect of each person in the target image may be improved to the greatest extent, thus improving a quality of the target image and improving a satisfaction degree of a user with the target image to a certain extent.

In an optional embodiment, the target effect image corresponding to each face has position information, and the target effect image is synthesized to the corresponding position on the reference image based on the position information of the target effect image.

It should be noted that, according to an embodiment of the present disclosure, any image in the to-be-processed image set may be determined as the reference image. The way to determine the reference image is not limited in the embodiment of the present disclosure, and those skilled in the art may select the way based on an actual need.

In an image processing method based on eye-state detection according to an embodiment of the present disclosure, first, eye state detection for a target face is performed in a to-be-processed image set to obtain target area images with an eye state meeting a preset condition. Then, a target effect image corresponding to the target face is determined from the target area images with the eye state meeting the preset condition. Finally, the target effect image is synthesized onto a reference image in the to-be-processed image set to obtain a target image corresponding to the to-be-processed image set. According to an embodiment of the present disclosure, an eye state is detected to determine a target effect image of each face, and the target effect image of each face is synthesized onto a reference image, which can improve an eye state effect of each person in the target image, improve a quality of the target image, and improve a satisfaction degree of a user with the target image to a certain extent.

In an image processing method based on eye-state detection according to an embodiment of the present disclosure, the eye state corresponding to the eye image may be determined based on position information of an eye key point.

Figure 2:
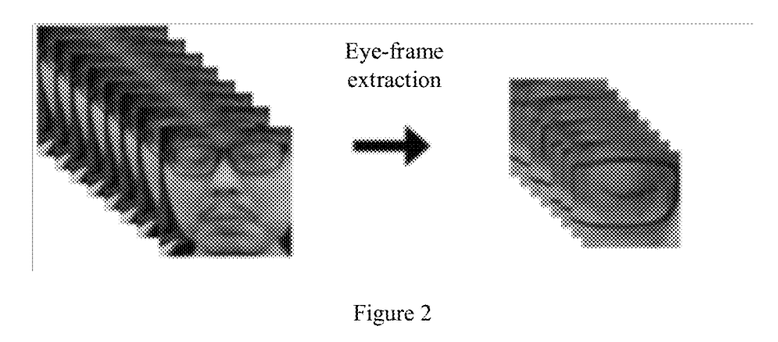
FIG. 2 is a schematic diagram of extracting an eye image according to an embodiment of the present disclosure.

In an optional embodiment, as shown in FIG. 2, corresponding eye images are extracted from 8 face images, respectively. Then, for each eye image, position information of an eye key point in the eye image is determined. Next, an eye state corresponding to the eye image is determined based on the position information of the eye key point. In an embodiment, the eye state corresponding to the eye image of the target face is determined as the eye state of the face image corresponding to the target face. The eye state may be indicated by an eye-openness.

Figure 3:
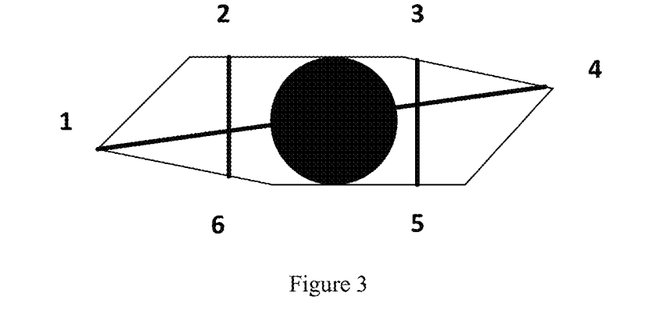
FIG. 3 is a schematic diagram of an eye key point in an eye image according to an embodiment of the present disclosure.

As shown in FIG. 3, the eye key points may include a key point 1 in a left canthus, key points 2 and 3 on a upper eyelid, a key point 4 in a right canthus, and key points 5 and 6 on a lower eyelid. After the 6 eye key points are determined, an eye-openness is determined based on position information of the eye key points.

In an optional embodiment, a distance between the key point 1 and the key point 4 in FIG. 3 may be determined as a distance between two canthi in a horizontal direction, and an average of a distance between the key point 2 and the key point 6 and a distance between the key point 3 and the key point 5 may be determined as an eye-opening width in a vertical direction. Then, a ratio of the eye-opening width in the vertical direction to the distance between the two canthi in the horizontal direction is determined as the eye-openness.

In an optional embodiment, the position information of the eye key point may be determined by using a machine learning model. Specifically, a first model is trained by using an eye image sample marked with the position information of the eye key point. The eye image is input into the trained first model. After being processed by the first model, the position information of the eye key point in the eye image is output.

In addition, in an image processing method based on eye-state detection according to an embodiment of the present disclosure, the eye state corresponding to the eye image may be determined based on an eye state value. The eye state value includes an eye-opening state value and an eye-closing state value. Specifically, the eye state value may be a value in a range of [0,1]. A larger eye state value indicates a larger eye-openness. On the contrary, a smaller eye state value indicates a smaller eye-openness. Specifically, the eye-closing state value may be a value in a range of [0,0.5), while the eye-opening state value may be a value in a range of [0.5,1]. In other embodiments, the eye-closing state value may be a value in a range of [0,0.5], while the eye-opening state value may be a value in a range of (0.5,1].

In an optional embodiment, the eye state value may be determined by using a machine learning model. Specifically, a second model is trained by using an eye image sample marked with the eye state value. The eye image is input into the trained second model. After being processed by the second model, the eye state value of the eye image is output.

In an embodiment of the present disclosure, the eye state corresponding to the eye image may be determined by the eye state value, and the target area image with the largest eye state value of the target face may be determined as the target effect image.

In order to improve an accuracy of eye state detection, according to an embodiment of the present disclosure, an eye-openness corresponding to the face image may be determined by combining the position information of the eye key point with the eye state value, thereby improving an accuracy of the target effect image determined based on the eye-openness, and further improving a quality of the target image.

Figure 4:
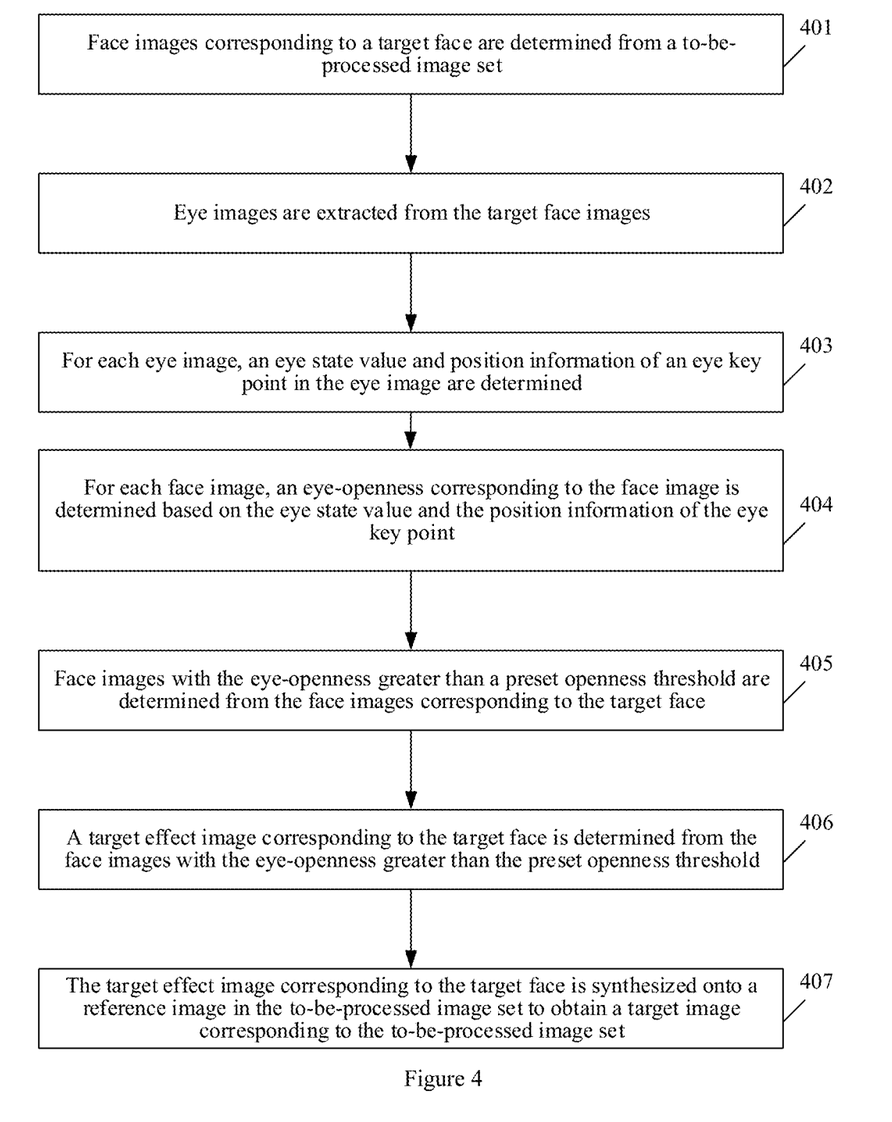
FIG. 4 is a flowchart of an image processing method based on eye-state detection according to another embodiment of the present disclosure.

An image processing method based on eye-state detection is provided according to an embodiment of the present disclosure. Reference is made to FIG. 4 which is a flowchart of an image processing method based on eye-state detection according to another embodiment of the present disclosure. The method includes the following steps S401 to S407.

In S401, face images corresponding to a target face are determined from a to-be-processed image set.

The to-be-processed image set includes multiple continuous preview images in which a current image frame corresponding to a moment of pressing a shutter key serving as an end frame.

The step S401 in the embodiment of the present disclosure may be understood with reference to the description of the above embodiment, which will not be repeated here.

In S402, eye images are extracted from the target face images.

Referring to FIG. 2, after the face images corresponding to the target face are determined, eye images corresponding to the target face are extracted based on the determined face images of the target face.

In an optional embodiment, an eye detection is performed on the face image, to determine position information of an eye in the face image. Then, based on the position information of the eye, a rectangular block including the eye is determined, and the rectangular block is extracted from the face image. An image corresponding to the extracted rectangular block is determined as the eye image. The eye detection is not described with details herein.

In practical application, it is considered that the eye states of two eyes in the face image are basically the same. Therefore, the eye image extracted according to the embodiment of the present disclosure may only include one of the eyes in the face image, thereby improving an efficiency of image processing.

In S403, for each eye image, an eye state value and position information of an eye key point in the eye image are determined.

In an embodiment of the present disclosure, after the eye image is extracted, an eye state value and position information of an eye key point in the eye image are determined.

In an optional embodiment, an eye state value and position information of an eye key point may be determined by using a machine learning model. Specifically, a third model is trained by using an eye image sample marked with the position information of the eye key point and the eye state value. The eye image is input into the trained third model. After being processed by the third model, the eye state value and the position information of the eye key point in the eye image are output.

In S404, for each face image, an eye-openness corresponding to the face image is determined based on the eye state value and the position information of the eye key point.

In an embodiment of the present disclosure, after the eye state value and the position information of the eye key point in the eye image are determined, a ratio of an eye-opening width in a vertical direction to a distance between two canthi in a horizontal direction in the face image may be determined based on the position information of the eye key point. Then, an eye-openness corresponding to the face image is determined by combining the ratio of the eye-opening width in the vertical direction to the distance between the two canthi in the horizontal direction with the eye state value.

In an optional embodiment, referring to FIG. 3, an eye-openness corresponding to the face image may be calculated by using the following Formula (1).

$$\text{Open\_Degree}(OD) = \frac{(V\_d\_1 + V\_d\_2)}{2 \times H\_d} * \text{round}(\text{Eye\_State}) + \text{Eye\_State} \quad (1)$$

Open_Degree (OD) is used to indicate an eye-openness corresponding to the face image. H_d is used to indicate an Euclidean distance between the key point 1 and the key point 4 in FIG. 3. V_d_1 is used to indicate an Euclidean distance between the key point 2 and the key point 6 in FIG. 3. V_d_2 is used to indicate an Euclidean distance between the key point 3 and the key point 5 in FIG. 3. Round ( ) is used to round a parameter. Eye_State is used to indicate an eye state value, which is in range of [0,1].

In S405, a face image with an eye-openness greater than a preset openness threshold is determined from the face images corresponding to the target face.

In an embodiment of the present disclosure, after the face images corresponding to the target face are determined, face images in an eye-closing state are removed based on the eye-openness, for any face. Then, face images with the eye-openness lower than or equal to the preset openness threshold are removed based on the eye-openness. Alternatively, remaining face images may be sorted based on the eye-openness to determine the face image with an open-close degree value greater than the preset openness threshold.

In an optional embodiment, if there is no face image with an eye-openness greater than the preset openness threshold in the face images of a certain face, the processing of the face image corresponding to the face in the reference image may not be omitted, keeping the effect of the face in the reference image unchanged.

In S406, a target effect image corresponding to the target face is determined from the face images with the eye-openness greater than the preset openness threshold.

In an embodiment of the present disclosure, after the face images of each face with the eye-openness greater than the preset openness threshold are determined, according to the method, a face image with the eye-openness greater than the preset openness threshold may be randomly selected from the face images corresponding to the target face, and the randomly selected face image is determined as a target effect image corresponding to the target face, to improve an eye state effect of the target face in a target image. For face images corresponding to other faces, similar processing may be carried out, and thus target effect images corresponding to other faces may be obtained.

In an optional embodiment, a larger eye-openness indicates a larger eye-opening degree, which is closer to a best eye state. Therefore, according to an embodiment of the present disclosure, a face image with a largest eye-openness is selected as the target effect image corresponding to the target face from the face images with the eye-openness greater than the preset openness threshold, to improve an eye state effect of the target face in the target image to the greatest extent.

In S407, the target effect image corresponding to the target face is synthesized onto a reference image in the to-be-processed image set to obtain a target image corresponding to the to-be-processed image set.

In an embodiment of the present disclosure, after the target effect images corresponding to respective faces are determined, the target effect images are synthesized onto a reference image. Finally, a target image corresponding to the to-be-processed image set is obtained.

In a multi-person photographing scene, based on the image processing method based on the eye state detection according to the present disclosure, it is possible to obtain a group photo with good eye states for most persons by shooting for only once. Therefore, the re-photographing is eliminated, which improves user experience in taking the group photo and improves the user's satisfaction degree with the group photo.

Figure 5:
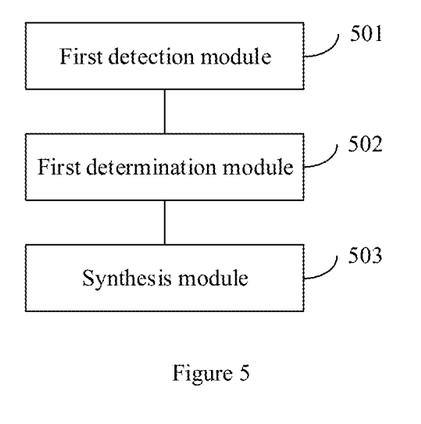
FIG. 5 is a structural block diagram of an image processing apparatus based on eye-state detection according to an embodiment of the present disclosure.

Based on the same inventive concept as the above method embodiments, an image processing apparatus based on eye-state detection is further provided according to the present disclosure. Reference is made to FIG. 5 which shows an image processing apparatus based on eye-state detection according to an embodiment of the present disclosure. The apparatus includes a first detection module 501, a first determination module 502, and a synthesis module 503.

The first detection module 501 is configured to perform eye state detection for a target face in a to-be-processed image set to obtain target area images each with an eye state meeting a preset condition, where the to-be-processed image set includes multiple continuous images, and each of the multiple images includes at least one face.

The first determination module 502 is configured to determine a target effect image corresponding to the target face based on the target area images each with the eye state meeting the preset condition.

The synthesis module 503 is configured to synthesize the target effect image corresponding to the target face onto a preset reference image in the to-be-processed image set to obtain a target image corresponding to the to-be-processed image set.

In an optional embodiment, the preset condition includes that an eye-openness is greater than a preset openness threshold.

In an optional embodiment, the first detection module includes a first determination sub-module and a first detection sub-module.

The first determination sub-module is configured to determine face images of the target face from the to-be-processed image set.

The first detection sub-module is configured to perform the eye state detection on the face images of the target face, to obtain face images each with an eye state meeting the preset condition from the face images of the target face as the target area images.

In an optional embodiment, the first detection sub-module includes an extraction sub-module and a second detection sub-module.

The extraction sub-module is configured to extract eye images of the target face from the face images of the target face.

The second detection sub-module is configured to perform the eye state detection on the eye images of the target face.

In an optional embodiment, the first detection module includes a second determination sub-module and a third detection sub-module.

The second determination sub-module is configured to determine eye images of the target face from the to-be-processed image set.

The third detection sub-module is configured to perform the eye state detection on the eye images of the target face, to obtain eye images each with the eye state meeting the preset condition from the eye images of the target face as the target area images.

In an optional embodiment, the second detection module or the third detection sub-module includes a third determination sub-module and a fourth determination sub-module.

The third determination sub-module is configured to determine position information of an eye key point in the eye image of the target face.

The fourth determination sub-module is configured to determine the eye state corresponding to the eye image based on the position information of the eye key point.

In an optional embodiment, the third determination sub-module is specifically configured to:
  input the eye image of the target face into a first model to obtain the position information of the eye key point in the eye image, where the first model is obtained by training with an eye image sample marked with the position information of the eye key point.

In an optional embodiment, the second detection module or the third detection sub-module includes a fifth determination sub-module and a sixth determination sub-module.

The fifth determination sub-module is configured to determine an eye state value in the eye image of the target face, where the eye state value includes an eye-opening state value and an eye-closing state value.

The sixth determination sub-module is configured to determine the eye state corresponding to the eye image based on the eye state value.

In an optional embodiment, the fifth determination sub-module is specifically configured to:
  input the eye image of the target face into a second model to obtain the eye state value in the eye image, where the second model is obtained by training with an eye image sample marked with the eye state value.

In an optional embodiment, the eye state corresponding to the eye image is determined based on a ratio of an eye-opening width in a vertical direction to a distance between two canthi in a horizontal direction; and the ratio of the eye-opening width in the vertical direction to the distance between the two canthi in the horizontal direction is determined based on the position information of the eye key point.

In an optional embodiment, the apparatus further includes an acquisition module.

The acquisition module is configured to acquire, in response to a trigger operation on a shutter key, a current image frame together with a plurality of continuous preview images ending at the current image frame, as the to-be-processed image set.

In an optional embodiment, the apparatus further includes a second determination module.

The second determination module is configured to determine, in the to-be-processed image set, a current image frame corresponding to a moment of pressing a shutter key as the reference image.

In an optional embodiment, the first determination module is specifically configured to:
  determine a target area image with a largest eye-openness among the target area images each with the eye state of the target face meeting the preset condition as the target effect image corresponding to the target face.

In an optional embodiment, the first determination sub-module includes a seventh determination sub-module and an eighth determination sub-module.

The seventh determination sub-module is configured to perform a face detection on the reference image in the to-be-processed image set, to determine position information of all faces in the reference image.

The eighth determination sub-module is configured to determine, based on the position information of all the faces, the face images corresponding to the position information of the target face on images of the to-be-processed image set, as the face images of the target face.

In an optional embodiment, the first determination sub-module includes a fourth detection sub-module and a ninth determination sub-module.

The fourth detection sub-module is configured to perform a face detection on each image in the to-be-processed image set to obtain a face image.

The ninth determination sub-module is configured to determine a face image with a similarity greater than a preset similarity threshold as the face image of the target face.

In an image processing apparatus based on eye-state detection according to an embodiment of the present disclosure, eye state detection for a target face is performed in a to-be-processed image set to obtain target area images each with an eye state of the target face meeting a preset condition. Then, a target effect image corresponding to the face is determined from the target area images with the eye state meeting the preset condition. Finally, the target effect image is synthesized onto a reference image in the to-be-processed image set to obtain a target image corresponding to the to-be-processed image set. According to an embodiment of the present disclosure, an eye state is detected to determine a target effect image of each face, and the target effect image of each face is synthesized onto a reference image, which can improve an eye state effect of each person in a final target image, improve a quality of the target image, and improve a satisfaction degree of a user with the target image to a certain extent.

Figure 6:
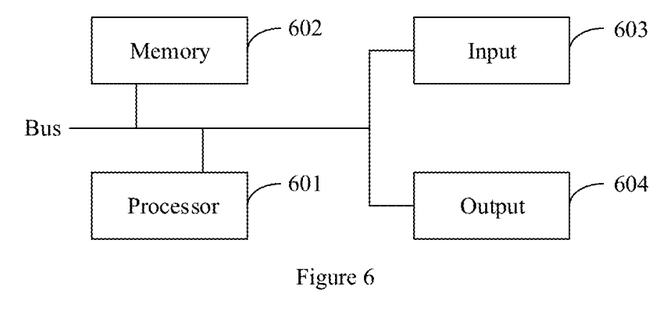
FIG. 6 is a structural block diagram of an image processing device based on eye-state detection according to an embodiment of the present disclosure.

In addition, a device for processing an image based on an eye state detection is further provided according to an embodiment of the present disclosure. As shown in FIG. 6, the device may include:
  a processor 601, a memory 602, an input apparatus 603 and an output apparatus 604. There may be one or more processors 601 in the device for processing the image based on the eye state detection. One processor is taken as an example in FIG. 6. In some embodiments of the present disclosure, the processor 601, the memory 602, the input apparatus 603 and the output apparatus 604 may be connected through a bus or other manner. In FIG. 6, a connection through the bus is taken as an example.

The memory 602 may be configured to store a software program and module. The processor 601 executes the software program and module stored in the memory 602, to perform various functional applications and data processing of the device for processing the image based on the eye state detection. The memory 602 may mainly include a program memory area and a data memory area. An operating system, an application required by at least one function and the like are stored in the program memory area. Moreover, the memory 602 may include a high-speed random access memory, and may further include a non-volatile memory, such as at least one disk storage device, a flash device or other volatile solid-state storage device. The input apparatus 603 may be configured to receive inputted number or character information, and generate a signal input related to user settings and function control of the device for processing the image based on the eye state detection.

In the embodiment, the processor 601 may load an executable file corresponding to the processes of one or more application programs into the memory 602 in response to an instruction, and the processor 601 executes the application program stored in the memory 602, thereby realizing various functions in the above device for processing the image based on the eye state detection.

A computer readable storage medium storing instructions is further provided according to an embodiment of the present disclosure. The instructions, when executed on a terminal device, cause the terminal device to implement the above method.

It should be noted that in the present disclosure, relational terms such as "first" and "second" are merely used to distinguish one entity or operation from another entity or operation, but do not indicate or imply an actual relationship or order of these entities or operations. In addition, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, an element defined by a statement of "including one . . . " does not exclude a case that other similar elements exist in the process, method, article or device including the element.

The above are only specific implementations of the present disclosure, so that those skilled in the art can understand or implement the present disclosure. Numerous modifications to the embodiments are apparent to those skilled in the art, and the general principles defined herein may be implemented in other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. An image processing method based on eye-state detection, comprising:
   determining face images of a target face on images in a to-be-processed image set, based on position information of the target face on a reference image in the to-be-processed image set;
   performing eye state detection on the face images of the target face to obtain target area images each with an eye state meeting a preset condition, wherein the to-be-processed image set comprises a plurality of continuous images, and each of the plurality of images comprises at least one face;
   determining a target effect image corresponding to the target face, based on the target area images each with the eye state meeting the preset condition; and
   synthesizing the target effect image corresponding to the target face onto the reference image in the to-be-processed image set, to obtain a target image corresponding to the to-be-processed image set.

2. The method according to claim 1, wherein the preset condition comprises that an eye-openness is greater than a preset openness threshold.

3. The method according to claim 1, wherein the performing the eye state detection on the face images of the target face comprises:
   extracting eye images of the target face from the face images of the target face; and
   performing the eye state detection on the eye images of the target face.

4. The method according to claim 3, wherein the performing the eye state detection on the eye images of the target face comprises:
   determining position information of an eye key point in the eye image of the target face; and
   determining the eye state corresponding to the eye image based on the position information of the eye key point.

5. The method according to claim 4, wherein the determining position information of an eye key point in the eye image of the target face comprises:
   inputting the eye image of the target face into a first model to obtain the position information of the eye key point in the eye image, wherein the first model is obtained by training with an eye image sample marked with the position information of the eye key point.

6. The method according to claim 5, wherein the eye state corresponding to the eye image is determined based on a ratio of an eye-opening width in a vertical direction to a distance between two canthi in a horizontal direction; and the ratio of the eye-opening width in the vertical direction to the distance between the two canthi in the horizontal direction is determined based on the position information of the eye key point.

7. The method according to claim 3, wherein the performing the eye state detection on the eye images of the target face comprises:
   determining an eye state value in the eye image of the target face, wherein the eye state value comprises an eye-opening state value and an eye-closing state value; and
   determining the eye state corresponding to the eye image based on the eye state value.

8. The method according to claim 7, wherein the determining an eye state value in the eye image of the target face comprises:
   inputting the eye image of the target face into a second model to obtain the eye state value in the eye image, wherein the second model is obtained by training with an eye image sample marked with the eye state value.

9. The method according to claim 1, wherein the performing eye state detection for a target face in a to-be-processed image set to obtain target area images each with an eye state meeting a preset condition comprises:
   determining eye images of the target face from the to-be-processed image set; and
   performing the eye state detection on the eye images of the target face, to obtain eye images with the eye state meeting the preset condition among the eye images of the target face, as the target area images.

10. The method according to claim 1, wherein before the performing eye state detection on the face images of the target face, the method further comprises:
    acquiring, in response to a trigger operation on a shutter key, a current image frame together with a plurality of continuous preview images ending at the current image frame, as the to-be-processed image set.

11. The method according to claim 1, wherein before the synthesizing the target effect image corresponding to the target face onto the reference image in the to-be-processed image set to obtain a target image corresponding to the to-be-processed image set, the method further comprises:

determining, in the to-be-processed image set, a current image frame corresponding to a moment of pressing a shutter key as the reference image.

12. The method according to claim 1, wherein the determining a target effect image corresponding to the target face based on the target area images each with the eye state meeting the preset condition comprises:

determining a target area image with a largest eye-openness among the target area images each with the eye state of the target face meeting the preset condition as the target effect image corresponding to the target face.

13. The method according to claim 1, wherein the determining face images of the target face from the to-be-processed image set further comprises:

performing face detection on all images in the to-be-processed image set to obtain face images; and determining face images with a similarity greater than a preset similarity threshold as the face images of the target face.

14. The method according to claim 1, further comprising:

selecting, in the to-be-processed image set, an image in which a maximum number of people have eye state meeting the preset condition, as the reference image.

15. An image processing device based on eye-state detection, comprising a memory, a processor, and a computer program stored in the memory and executable on the processor, wherein the processor is configured to execute the computer program to implement:

determining face images of a target face on images in a to-be-processed image set, based on position information of the target face on a reference image in the to-be-processed image set;

performing eye state detection on the face images of the target face to obtain target area images each with an eye state meeting a preset condition, wherein the to-be-processed image set comprises a plurality of continuous images, and each of the plurality of images comprises at least one face;

determining a target effect image corresponding to the target face, based on the target area images each with the eye state meeting the preset condition; and synthesizing the target effect image corresponding to the target face onto the reference image in the to-be-processed image set, to obtain a target image corresponding to the to-be-processed image set.

16. The device according to claim 15, wherein the processor is further configured to execute the computer program to implement:

extracting eye images of the target face from the face images of the target face; and performing the eye state detection on the eye images of the target face.

17. The device according to claim 15, wherein the processor is further configured to execute the computer program to implement:

determining eye images of the target face from the to-be-processed image set; and performing the eye state detection on the eye images of the target face, to obtain eye images with the eye state meeting the preset condition among the eye images of the target face, as the target area images.

18. A non-transitory computer readable storage medium having instructions stored thereon, wherein the instructions, when being executed on a terminal device, cause the terminal device to implement:

determining face images of a target face on images in a to-be-processed image set, based on position information of the target face on a reference image in the to-be-processed image set;

performing eye state detection on the face images of the target face to obtain target area images each with an eye state meeting a preset condition, wherein the to-be-processed image set comprises a plurality of continuous images, and each of the plurality of images comprises at least one face;

determining a target effect image corresponding to the target face, based on the target area images each with the eye state meeting the preset condition; and synthesizing the target effect image corresponding to the target face onto the reference image in the to-be-processed image set, to obtain a target image corresponding to the to-be-processed image set.

* * * * *